US008249273B2

(12) United States Patent
Inoda et al.

(10) Patent No.: US 8,249,273 B2

(45) Date of Patent: Aug. 21, 2012

(54) SOUND INPUT DEVICE

(75) Inventors: Takeshi Inoda, Osaka (JP); Ryusuke Horibe, Osaka (JP); Fuminori Tanaka, Osaka (JP); Shigeo Maeda, Hyogo (JP); Rikuo Takano, Ibaraki (JP); Kiyoshi Sugiyama, Tokyo (JP); Toshimi Fukuoka, Kanagawa (JP); Masatoshi Ono, Ibaraki (JP)

(73) Assignees: Funai Electric Co., Ltd., Osaka (JP); Funai Electric Advanced Applied Technology Research Institute Inc., Osaka (JP)

( * ) Notice: Subject to any disclaimer, the term of this patent is extended or adjusted under 35 U.S.C. 154(b) by 750 days.

(21) Appl. No.: 12/330,227

(22) Filed: Dec. 8, 2008

(65) Prior Publication Data

US 2009/0147968 A1 Jun. 11, 2009

(30) Foreign Application Priority Data

Dec. 7, 2007 (JP) ................................ 2007-317719

(51) Int. Cl.
*H04B 15/00* (2006.01)

(52) U.S. Cl. ......................... 381/94.3; 381/91; 381/94.1

(58) Field of Classification Search .................... 381/91, 381/94.1, 94.3

See application file for complete search history.

(56) References Cited

U.S. PATENT DOCUMENTS

| | | | | |
|---|---|---|---|---|
| 5,267,323 | A * | 11/1993 | Kimura | 381/110 |
| 6,704,422 | B1 * | 3/2004 | Jensen | 381/313 |
| 2003/0147538 | A1 | 8/2003 | Elko | |
| 2009/0175466 | A1 * | 7/2009 | Elko et al. | 381/94.2 |

FOREIGN PATENT DOCUMENTS

| | | |
|---|---|---|
| JP | 6-269084 | 9/1994 |
| JP | 7-312638 | 11/1995 |
| JP | 9-331377 | 12/1997 |
| JP | 2001-186241 | 7/2001 |
| WO | 2007/106399 A2 | 9/2007 |

OTHER PUBLICATIONS

European Search Report for European Application No. 08021309.3-225, mailed on Apr. 9, 2009 (6 pages).

Patent Abstracts of Japan for Japanese Publication No. 06269084, Publication date Sep. 22, 1994 (1 page).

* cited by examiner

*Primary Examiner* — Wai Sing Louie

(74) *Attorney, Agent, or Firm* — Osha • Liang LLP

(57) ABSTRACT

A sound input device includes a differential microphone, configured to receive sound including noise, and generate a first signal in accordance with the sound; a detector, configured to detect the noise, and generate a second signal in accordance with the detected noise; and a controller, configured to control at least one of suppression of high-frequency components of the first signal and changing of a frequency band to be suppressed of the first signal based on the second signal.

9 Claims, 10 Drawing Sheets

SOUND INPUT DEVICE

BACKGROUND

1. Field of the Invention

The present invention relates to a sound input device.

2. Description of the Related Art

In the course of a telephone call, voice recognition or voice recording, it is preferable to collect only the target voice (user's voice). However, the use environment of a sound input device may include sounds except the target voice such as background noise. Thus, there have been developed sound input devices capable of removing noise.

There are known techniques for removing background noise in a use environment including noise. One technique removes noise by using a microphone having high directivity. Another technique removes noise by identifying the direction of arrival of sound waves using a difference in the arrival time of sound waves and subsequent signal processing.

In recent years, electronic devices have been shrinking in size and techniques for downsizing a sound input device are getting more and more important. The above technical ideas are disclosed in JP-A-7-312638, JP-A-9-331377 and JP-A-2001-186241.

FIG. 11 illustrates the frequency response of a differential microphone. The horizontal axis represents a frequency (kHz) and the vertical axis an output sound pressure value (decibel) A numeral 1002 is a graph of a function representing the relationship between the frequency and the output value (decibel) of a differential microphone assumed in case a sound source is at a distance of about 25 mm from the differential microphone (in case the sound source is at the position of a speaker assumed with a close-talking sound input device). A numeral 1004 is a graph of a function representing the relationship between the frequency and the output value (decibel) of a differential microphone assumed in case a sound source is at a distance of about 1000 mm from the differential microphone (noise sufficiently distant from a close-talking sound input device).

While a differential microphone is known to provide an effect to suppress distant noise, the sensitivity of a differential microphone increases in the high frequency range as shown by the numerals 1002 and 1004. Thus, the high-frequency components of the noise from a differential microphone are likely to be emphasized. The high-frequency components of a talker's voice or noise tend to be emphasized to produce unnatural audible effects or nagging sound quality.

SUMMARY

It is therefore one advantageous aspect of the invention to provide a sound input device that offers an easy-to-hear sound signal while maintaining the characteristics of a differential microphone.

According to an aspect of the present invention, there is provided a sound input device including; a differential microphone, configured to receive sound including noise, and generate a first signal in accordance with the sound; a detector, configured to detect the noise, and generate a second signal in accordance with the detected noise; and a controller, configured to control at least one of suppression of high-frequency components of the first signal and changing of a frequency band to be suppressed of the first signal based on the second signal.

The controller may perform the control of activating/deactivating suppression of the frequency components above a predetermined frequency of a differential signal outputted from the differential microphone based on the result of comparison between the result of measurement by the detector and a predetermined threshold value.

The controller may perform the control of changing the frequency band to be suppressed based on the result of comparison between the result of measurement by the detector and a predetermined threshold value.

With the invention, the frequency components above a predetermined frequency of a differential signal outputted from a differential microphone are not suppressed in case the ambient noise is lower than a predetermined level or in case high-frequency noise is low and the frequency components above a predetermined frequency of a differential signal are suppressed in case the ambient noise is higher than a predetermined level. It is thus possible to provide a sound input device that offers an easy-to-hear sound signal while maintaining the characteristics of a differential microphone, that is, a sound input device capable of emphasizing the high-frequency band in a quiet environment to make a voice clear and suppressing the emphasis on the high-frequency band of the background noise in a highly noisy environment thereby improving the SNR (Signal to Noise Ratio).

According to another aspect of the invention, there is provided a sound input device, including: a microphone, configured to receive sound including noise, and generate a signal in accordance with the sound; a information receiver, configured to receive information related to the noise; and a controller, configured to control at least one of suppression of high-frequency components of the signal and changing of a frequency band to be suppressed of the first signal based on the information.

The information may be accepted by way of an operation input from an operation part such as a button or a switch arranged on a sound input device. For example, feeling that the surroundings are noisy, the user may turn on the noise suppression mode and the frequency components above a predetermined frequency of a differential signal outputted from the differential microphone may be suppressed in the noise suppression mode.

With the invention, the user may input noise suppression mode information depending on the ambient environment. It is thus possible to provide a sound input device that offers an easy-to-hear sound signal while maintaining the characteristics of a differential microphone, that is, a sound input device capable of emphasizing the high-frequency band in a quiet environment to make a voice clear and suppressing the emphasis on the high-frequency band of the background noise in a highly noisy environment thereby improving the SNR (Signal to Noise Ratio).

The controller may include a low-pass filter configured to suppress the high-frequency components.

The controller may control whether or not the signal passes the low-pass filter based on the information.

The controller may include a plurality of low-pass filters configured to suppress the high-frequency components, each of the low-pass filters being related to different frequency bands.

And, the controller may change the low-pass filters to be passed the signal based on the information.

The controller may include a low-pass filter configured to suppress the high-frequency components.

And, the controller may change a cutoff frequency of the low-pass filter based on the information.

A low-pass filter capable of changing a cutoff frequency may be implemented by using a low-pass filter capable of variably controlling the resistance and changing the resistance value of the low-pass filter based on the result of measurement by the detector or noise suppression mode information.

The controller may include a low-pass filter having first-order cutoff characteristics to suppress the high-frequency components.

The controller may include a low-pass filter, a cutoff frequency of the low-pass filter falling within either of a range no less than 1 kHz or a range no more than 5 kHz.

The detector may include a generator configured to change a delay balance of the differential microphone to generate the second signal.

A change in the delay balance of a differential microphone may be made by giving a delay to an input signal from one microphone in case a differential signal is generated based on input signals from two microphones.

In case a differential signal s generated based on an input signal from a single microphone, the microphone may be relocated to change the delay balance.

The detector may generate the second signal by referencing the first signal.

The differential microphone may include: a first microphone having a first vibrating membrane; a second microphone having a second vibrating membrane; and a differential signal generator, configured to generate a differential signal indicative of a difference between a first voltage signal acquired by the first microphone and a second voltage signal acquired by said second microphone.

The detector may include; a first unit, configured to give a delay for noise detection to the second voltage signal; and a second unit, configured to generate the second signal based on a difference between the second voltage signal given the delay by the first unit and the first voltage signal.

The delay may be set to a time period obtained by dividing a distance between centers of the first and second vibrating membranes by the velocity of sound.

The sound input device may further include: a loudspeaker, configured to output sound information; and a sound level controller, configured to control sound level of the loudspeaker based on the second signal.

The sound level of the loudspeaker may be raised when the level of the noise is higher than a predetermined level. The sound level of the loudspeaker may be dropped when the level of the noise is lower than a predetermined level.

BRIEF DESCRIPTION OF THE DRAWINGS

Embodiment may be described in detail with reference to the accompanying drawings, in which.

DETAILED DESCRIPTION OF THE INVENTION

Embodiments to which the invention is applied will be described referring to figures. Note that the invention is not limited to the embodiments described below. The invention includes any combination of the following embodiments.

Figure 1:
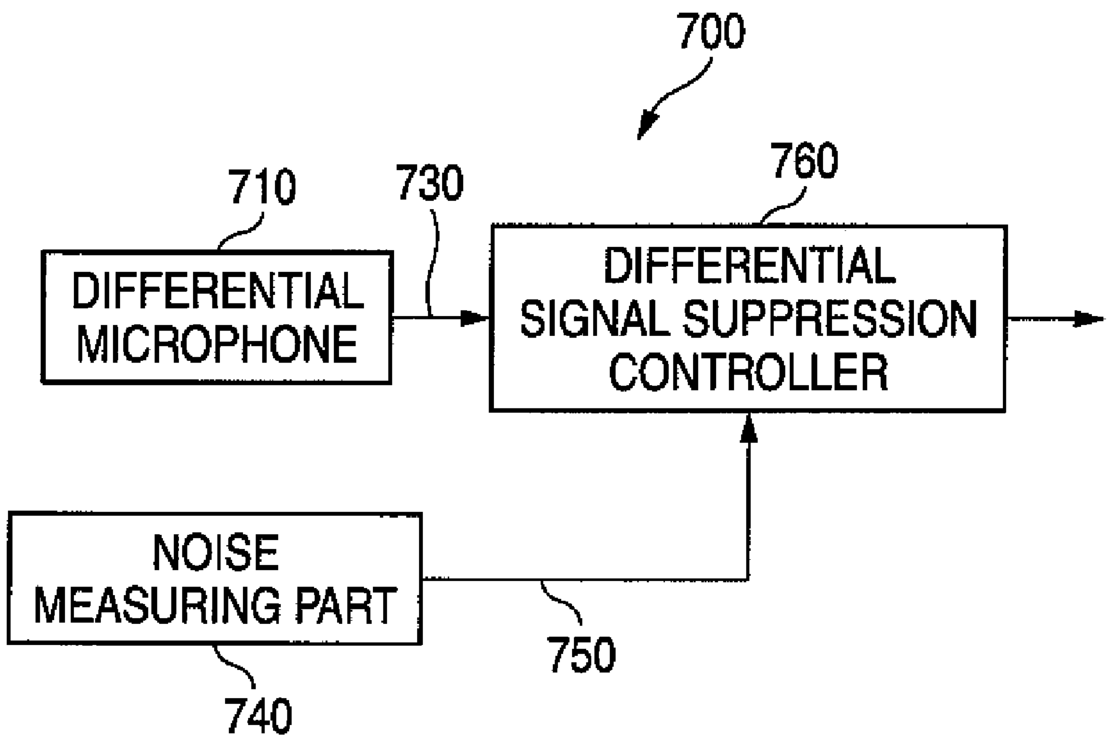
FIG. 1 illustrates a sound input device.

FIG. 1 illustrates the configuration of a sound input device according to this embodiment.

A sound input device 700 according to this embodiment includes a differential microphone 710. The differential microphone 710 generates and outputs a differential signal 730 based on a sound signal inputted to two sound receiving parts. The differential signal may be generated based on input signals from a plurality of microphones or based on the difference in the sound pressures inputted to the front surface and rear surface of a vibrating membrane by a single microphone.

The sound input device 700 according to this embodiment includes a noise measuring part 740. The noise measuring part 740 measures the noise around the differential microphone and outputs a measurement result 750. The noise measuring part 740 may collect sound for example by using a microphone for collection of noise (for example a microphone having omnidirectivity) and digitally detect the noise spectrum to measure the magnitude of noise.

The sound input device 700 according to this embodiment includes a differential signal suppression controller 760. The differential signal suppression controller 760 suppresses the frequency components above a predetermined frequency of a differential signal 730 outputted from a differential microphone 710 based on the measurement result of the noise measuring-part 740. For example, the measurement result 750 of the noise measuring part 740 may be compared with a predetermined threshold value and activation/deactivation of suppression of the frequency components above a predetermined frequency of the differential signal 730 outputted from the differential microphone 710 may be controlled based on the comparison result.

Figure 13:
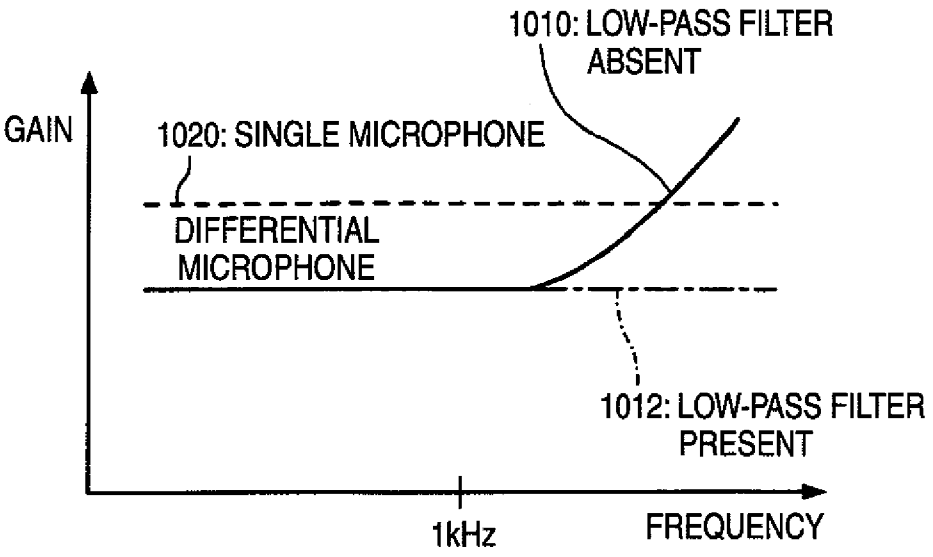
FIG. 13 illustrates the frequency response of a differential microphone.

Suppression of the frequency components above a predetermined frequency of the differential signal 730 may be made using a low-pass filter. The low-pass filter may be a filter having first-order cutoff characteristics. As illustrated in FIG. 13, the high-frequency range of a differential signal rises with the first-order characteristics (20 dB/dec). Attenuating the high-frequency range with a first-order low-pass filter having the reverse characteristics keeps flat the frequency response of a differential signal thus preventing unnatural audible effects.

The cutoff frequency of a low-pass filter may be set to any value within the range from 1 kHz to 5 kHz both inclusive.

Setting an extremely low cutoff frequency of a low-pass filter results in a muffled sound while setting an extremely high cutoff frequency produces nagging high-frequency noise. It is preferable to set the cutoff frequency to an optimum value in accordance with the distance between microphones. An optimum cutoff frequency depends on the distance between microphones. In case the distance between microphones is about 5 mm, the cutoff frequency of a low-pass filter is preferably set to a value within the range from 1.5 kHz to 3 kHz both inclusive.

Figure 11:
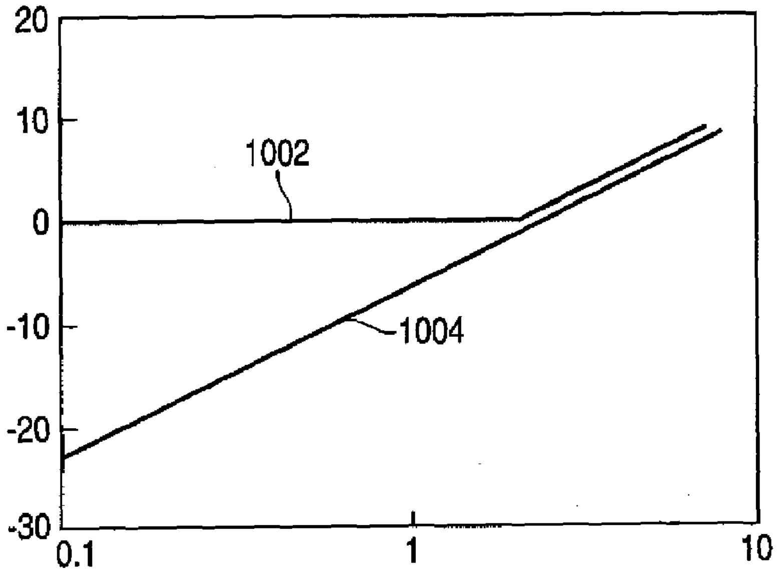
FIG. 11 illustrates the frequency response of a differential microphone.
Figure 12:
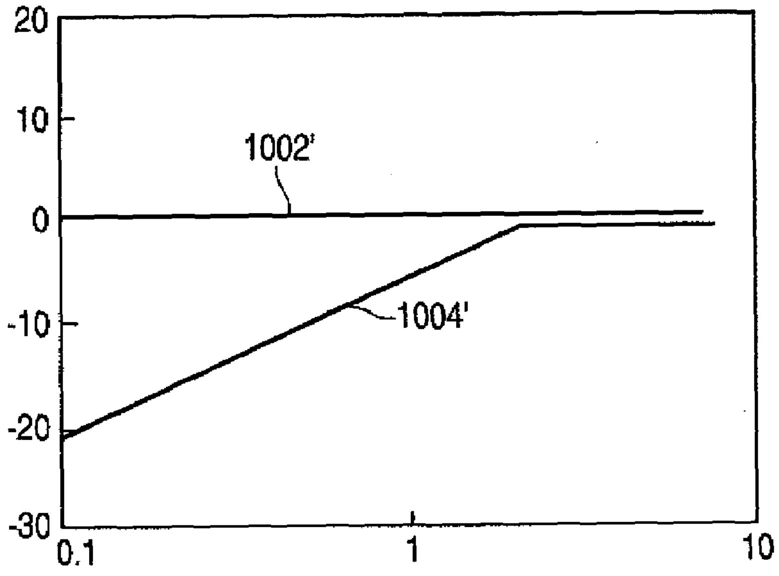
FIG. 12 illustrates the frequency response of a differential microphone.

FIG. 12 illustrates the frequency response obtained in case a low-pass filter is arranged in the subsequent stage of a differential microphone in FIG. 11. The horizontal axis represents a frequency (kHz) and the vertical axis an output value (decibel). A numeral 1002' is a graph of a function representing the relationship between the frequency and the output value (decibel) of a differential microphone assumed in case a sound source is at a distance of about 25 mm from the differential microphone (in case the sound source is at the position of a speaker assumed with a close-talking sound input device) A numeral 1004' is a graph of a function representing the relationship between the frequency and the output value (decibel) of a differential microphone assumed in case a sound source is at a distance of about 1000 mm from the differential microphone (noise sufficiently distant from a close-talking sound input device).

As shown by the numerals 1002' and 1004', it is possible to suppress emphasis on the high tones of a nearby talker and background noise by arranging a low-pass filter in the subsequent stage of a differential microphone.

FIG. 13 illustrates the frequency response of a differential microphone. The horizontal axis represents a frequency and the vertical axis a gain. A numeral 1010 is a graph showing the relationship between the frequency and the gain of a differential microphone at an assumed position of a talker and represents the frequency response at a position distant from the centers of a first microphone 710-1 and a second microphone 710-2 by some 25 mm. A numeral 1012 is a graph showing the relationship between the frequency and the gain of a differential microphone that has passed through a low-pass filter provided in the subsequent stage of a differential microphone.

While a first microphone 712-1 and a second microphone 712-2 each exhibit a flat frequency response, the high-frequency range of a differential signal starts to rise with the first-order characteristics (20 dB/dec) around 1 kHz as shown by the numeral 1010. Attenuating the high-frequency range with a first-order low-pass filter having the reverse characteristics keeps flat the frequency response of a differential signal thus preventing unnatural audible effects.

Human ears tend to exhibit reduced high tone sensitivity with age so that an emphasized high tone may give clearer sound depending on the situation.

In this embodiment, it is possible to activate/deactivate suppression of the frequency components above a predetermined frequency of a differential signal outputted from the differential microphone 710 or change the frequency band to be suppressed based on the result of measurement by the noise measuring part 740. In case the ambient noise is lower than a predetermined level or in case high-frequency noise is low, the differential signal is outputted with the low-pass filter turned off (without the differential signal passing through the low-pass filter) In case the ambient noise is higher than a predetermined level (in case the ambient noise level is high irrespective of high frequencies or low frequencies), the differential signal is outputted with the low-pass filter turned on (with the differential signal passing through the low-pass filter). It is thus possible to provide a sound input device that offers an easy-to-hear sound signal while maintaining the characteristics of a differential microphone, that is, a sound input device capable of emphasizing the high-frequency band in a quiet environment to make a voice clear and suppressing the emphasis on the high-frequency band of the background noise in a highly noisy environment thereby improving the SNR (Signal to Noise Ratio).

Figure 2:
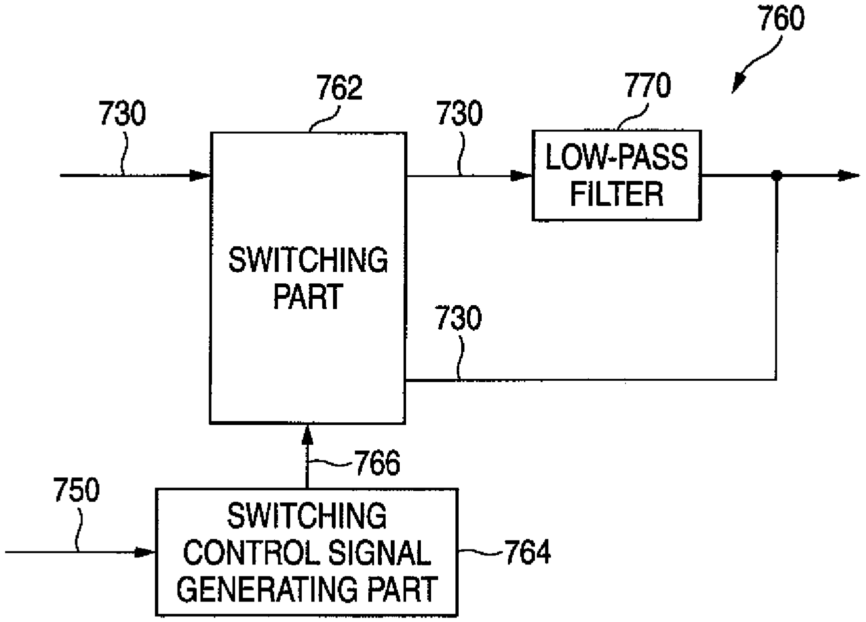
FIG. 2 illustrates a differential signal suppression controller.
Figure 3:
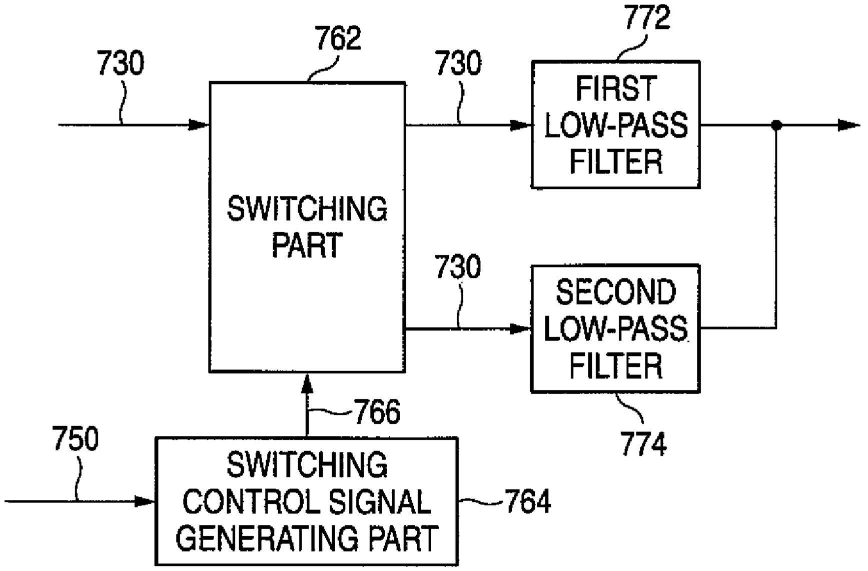
FIG. 3 illustrates the differential signal suppression controller.

FIGS. 2 and 3 illustrate an exemplary configuration of a sound input device according to this embodiment.

The differential signal suppression controller 760 may include a filter for suppressing the frequency components above a predetermined frequency of a differential signal 730 outputted from a differential microphone 710. The differential signal suppression controller 760 may compare the measurement result 750 of the noise measuring part 740 with a predetermined threshold value and determine whether noise is present/absent or high/low and, on determining that noise is present or high, may suppress the frequency components above a predetermined frequency of a differential signal.

For example, as shown in FIG. 2, the differential signal suppression controller 760 may include a low-pass filter 770 for cutting the high-frequency components of the differential signal 730, a switching control signal generating part 762 for generating and outputting a switching control signal 766 for switching the output path of the differential signal 730 based on the measurement result 750 of the noise measuring part 740, and a switching part 762 for switching the output path of the differential signal 730 to cause the differential signal 730 to pass through the low-pass filter 770 or to bypass the same. The switching part 762 may be for example a switch circuit or a selector circuit.

The differential signal suppression controller 760 may compare the result of measurement by the noise measuring part 740 with one or more reference values and change the frequency band of to be high-frequency suppressed of the differential signal 730 outputted from the differential microphone 710 based on the comparison result.

For example, as shown in FIG. 3, the differential signal suppression controller 760 may include a plurality of filters having different cutoff frequency bands (a first low-pass filter 772 and a second low-pass filter 774 in this example) for suppressing the frequency components above a predetermined frequency of the differential signal 730, a switching control signal generating part 762 for generating and outputting a switching control signal 766 for switching between output paths of the differential signal 730 based on the result of measurement by the noise measuring part 740, and a switching part 762 for switching the output path of the differential signal 730 to cause the differential signal 730 to pass through the first low-pass filter 772 or the second low-pass filter 774. The switching part 762 may be for example a switch circuit or a selector circuit.

In case a low-pass filter capable of changing a cutoff frequency is used, control may be made to change the cutoff frequency of the low-pass filter based on the switching control signal 766. In case a resistor and a capacitor are used to configure a low-pass filter, the cutoff frequency may be readily changed by changing the resistance value.

For example, a first low-pass filter 772 having a cutoff frequency of 1.5 kHz and a second low-pass filter 774 having a cutoff-frequency of 10 kHz may be provided and one of these low-pass filters may be selected in accordance with the noise level. In a highly noisy environment, it is possible to use the first low-pass filter 772 having a lower cutoff frequency to suppress distant noise and nagging high-tone-emphasized background noise. In a less noisy environment, it is possible to use the second low-pass filter 774 having a higher cutoff frequency to provide high-tone-emphasized characteristics.

The high-band power of the background noise is low in a less noisy environment so that the high-tone-emphasized characteristics are not nagging. The high tone of a talker's voice is emphasized, thus compensating for reduction in the high-tone sensitivity of human ears that declines with age and offering a clear voice.

Arrangement is possible in which the first low-pass filter 772 is used in case the noise is above a predetermined threshold value and the second low-pass filter 774 is used in case the noise is below the predetermined threshold value.

Figure 4:
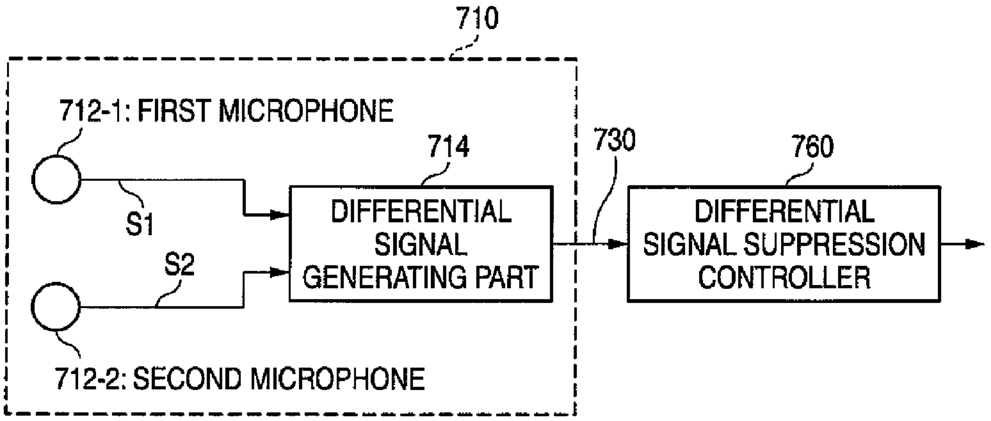
FIG. 4 illustrates a differential microphone.

FIG. 4 illustrates an exemplary configuration of the differential microphone of a sound input device according to this embodiment.

A differential microphone 710 may include a first microphone 712-1 having a first vibrating membrane, a second microphone 712-2 having a second vibrating membrane, and a differential signal generating part 714. The differential signal generating part 714 generates a differential signal of a first voltage signal S1 acquired by the first microphone 712-1 and a second voltage signal S2 acquired by the second microphone 712-2 based on the first voltage signal S1 and the second voltage signal S2.

With this configuration, a differential signal representing the difference between the first and second voltage signals acquired by the first and second microphones may be assumed as a signal representing an input voice with noise components removed. With the invention, it is possible to provide a sound input device capable of implementing a noise removal feature with a simple configuration of generating a differential signal.

In the sound input device, the differential signal generating part generates a differential signal without performing analysis processing such as Fourier analysis processing. This reduces the signal processing workload of the differential signal generating part and allows generation of a differential signal at a low cost by using an extremely simple circuit.

The differential signal generating part 714 may input the first voltage signal S1 acquired by the first microphone 712-1, amplify the signal S1 with a predetermined amplification factor (gain), and generate and output a differential signal 730 based on the different between a first voltage signal S1' obtained through amplification with a predetermined gain and the second voltage signal S2 acquired by the second microphone 712-2.

The differential signal generating part 714 may give a predetermined delay to at least one of the first voltage signal S1 acquired by the first microphone 712-1 and the second voltage signal S2 acquired by the second microphone 712-2 and generate and output a differential signal based on the difference between the first voltage signal and the second voltage signal at least one of which is given a delay.

A microphone is an electroacoustic converter for converting an acoustic signal to an electric signal. The first and second microphones 712-1, 712-2 may be converters for respectively outputting vibrations of the first and second vibrating membranes (diaphragm) as voltage signals.

The mechanism of each of the first and second microphones 712-1, 712-2 is not particularly limited. Each of the first and second microphones may be a capacitor microphone including a vibrating membrane. The vibrating membrane that is a membrane (thin film) to vibrate when receiving sound waves is conductive and forms one end of an electrode. An electrode of a capacitor microphone is arranged while opposed to a vibrating membrane The vibrating membrane and the electrode form a capacitor. When sound waves impinge, the vibrating membrane vibrates to change the spacing between the vibrating membrane and the electrode thus changing the capacitance between the vibrating membrane and the electrode. By outputting the change in the capacitance for example as a change in the voltage, it is possible to convert sound waves impinging on a capacitor microphone to an electric signal. Microphones applicable to the invention are not limited to capacitor microphones. Any well-known microphone may be applied. For example, dynamic microphones, magnetic microphones, or piezoelectric (crystal) microphones may be used as the first and second microphones 712-1, 712-2.

Each of the first and second microphones 712-1, 712-2 may be a silicon microphone (Si microphone) having the first and second vibrating membranes made of silicon. Introducing a silicon microphone downsizes and sophisticates the first and second microphones 712-1 and 712-2. In this case, the first and second microphones 712-1 and 712-2 may be implemented on a single semiconductor substrate. The first and second microphones 712-1 and 712-2 may be implemented as so-called MEMS (Micro Electric Mechanical Systems). The first and second vibrating membranes 12, 22 may be arranged so that the distance between centers will be 5.2 mm or below, for example.

The orientation of each of the first and second vibrating membranes is not particularly limited with the sound input device according to the invention.

Figure 5:
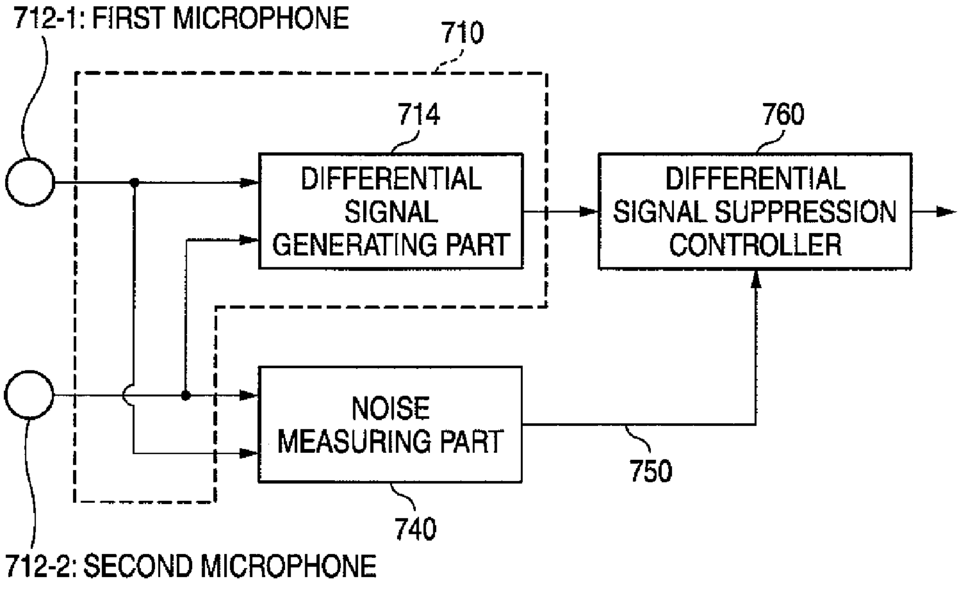
FIG. 5 illustrates a noise measuring part.

FIG. 5 illustrates an exemplary configuration of the noise measuring part of a sound input device according to this embodiment.

The noise measuring part 740 measures the noise around the differential microphone and outputs a noise measurement result signal 750 based on at least one of the first voltage signal acquired by the first microphone 712-1 and the second voltage signal acquired by the second microphone 712-1.

The differential signal suppression controller 760 performs the control of suppressing the frequency components above a predetermined frequency of a differential signal outputted from the differential microphone 710 based on the noise measurement result signal 750.

With this approach, the noise around the differential microphone is measured based on at least one of the first voltage signal acquired by the first microphone 712-1 and the second voltage signal acquired by the second microphone 712-2. It is thus unnecessary to provide a separate microphone for noise measurement.

Figure 6:
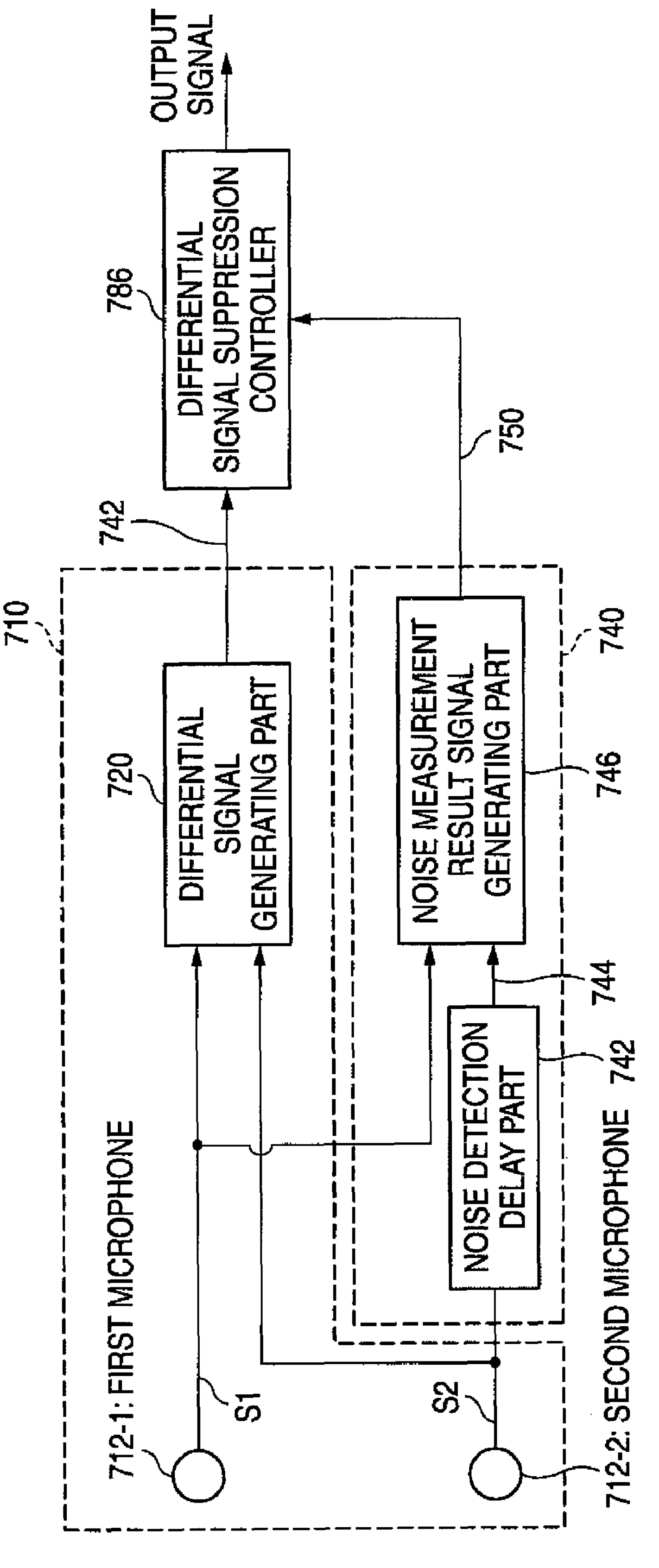
FIG. 6 illustrates the noise measuring part.

FIG. 6 illustrates an exemplary configuration of the noise measuring part of a sound input device according to this embodiment.

The noise measuring part 740 may include a noise detection delay part 742 for giving a delay for noise detection to the second voltage signal acquired by the second microphone 712-2 and a noise measurement result signal generating part 746 for obtaining the difference between the second voltage signal 744 given a predetermined delay for noise detection by the noise detection delay part 742 and the first voltage signal S1 acquired by the first microphone 712-1 and generating a noise measurement result signal 750 based on the difference.

With this configuration, it is possible to control the directivity of a differential microphone to detect the state of ambient noise excluding a talker's voice and perform the control of activating/deactivating suppression of the frequency components above a predetermined frequency of a differential signal outputted from the differential microphone or the control of changing the frequency band to be suppressed based on the level of the detected noise.

Figure 7:
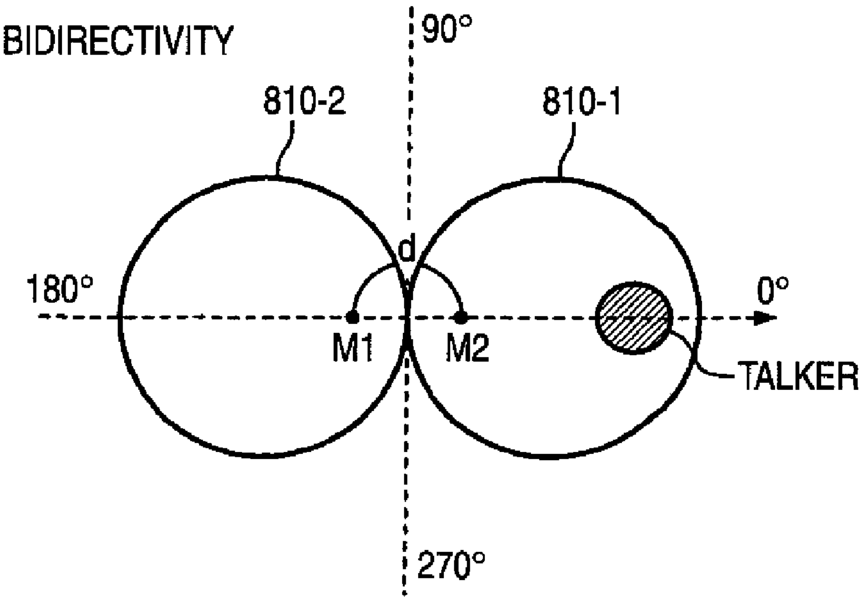
FIG. 7 illustrates the directivity of a differential microphone.
Figure 8:
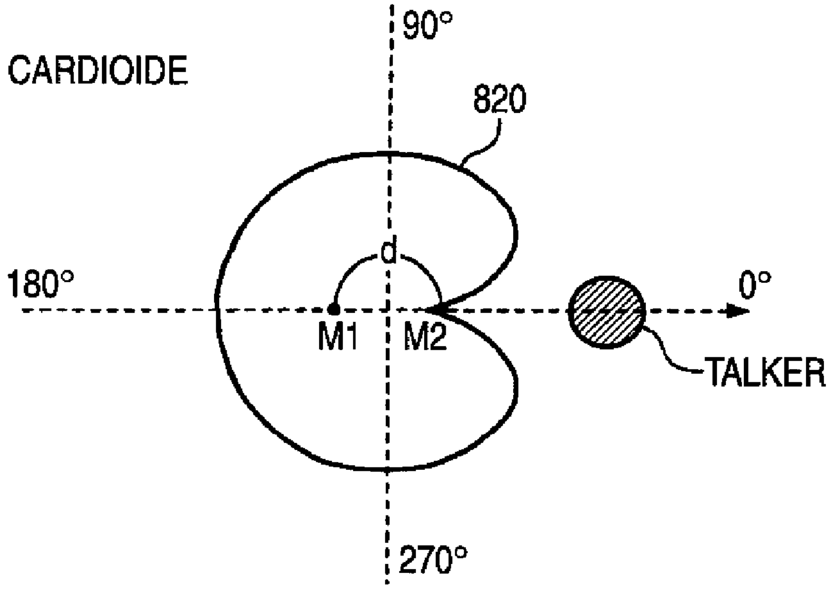
FIG. 8 illustrates the directivity of a differential microphone.

FIGS. 7 and 8 illustrate the directivity of a differential microphone.

FIG. 7 shows the directivity of two microphones M1, M2 without a phase shift. Circular regions 810-1, 810-2 show the directivity obtained by the difference between the outputs of the microphones M1, M2. Assuming that the linear direction connecting the microphones M1, M2 is at angles of 0 and 180 degrees and the direction perpendicular to the linear direction connecting the microphones M1, M2 is at angles of 90 and 270 degrees, it is found that the microphones M1, M2 have bidirectivity exhibiting a maximum sensitivity in the direction at 0 and 180 degrees and no sensitivity in the direction at 90 and 270 degrees.

In case one of the signals captured by the microphones M1, M2 is given a delay, the directivity changes. For example, in case a delay corresponding to a time obtained by dividing the microphone spacing d by the velocity of sound c is given to the output of the microphone M2, the regions representing the directivity of the microphones M1, M2 shows a cardioide directivity as shown by a numeral 820 in FIG. 8. In this case, it is possible to implement a (null) directivity insensitive in the direction of a talker at 0 degrees. This makes it possible to selectively cut a talker's voice and capture the ambient sound (ambient noise) alone.

For example, in case the microphone spacing d is 5 mm, a delay amount of 14.7 μs should be set assuming the velocity of sound is 340 m/s.

Thus, a delay for noise detection 742 may be set to a time obtained by dividing the distance between the centers of the first and second diaphragm by the velocity of sound. For example, a delay corresponding to a time obtained by dividing the microphone spacing d by the velocity of sound c may be given to the second voltage signal acquired by the second microphone 712-2 and a noise measurement result signal 750 may be generated based on a calculated difference between the second voltage signal 744 given the delay and the first voltage signal S1 acquired by the first microphone 712-1. By setting a delay amount, attaining the cardioide directivity of a sound input device and setting the position of a talker near the null position of directivity, it is possible to provide directivity that easily cuts a talker's voice and capture the ambient noise alone, an advantageous approach in terms of noise detection.

The delay for noise detection need not be a time obtained by dividing the distance between centers of the first and second diaphragms (refer to d in FIG. 7) by the velocity of sound. When the direction insensitive in terms of directivity is successfully set to the direction of a talker even in case the direction of a talker is not the direction at an angle of 0 degrees, it is possible to provide characteristics suited for noise detection having directivity that cuts a talker's voice and capture the ambient noise alone. For example, a delay may be set to have hyper-cardioide or super-cardioide directivity so as to cut the talker's voice.

Figure 9:
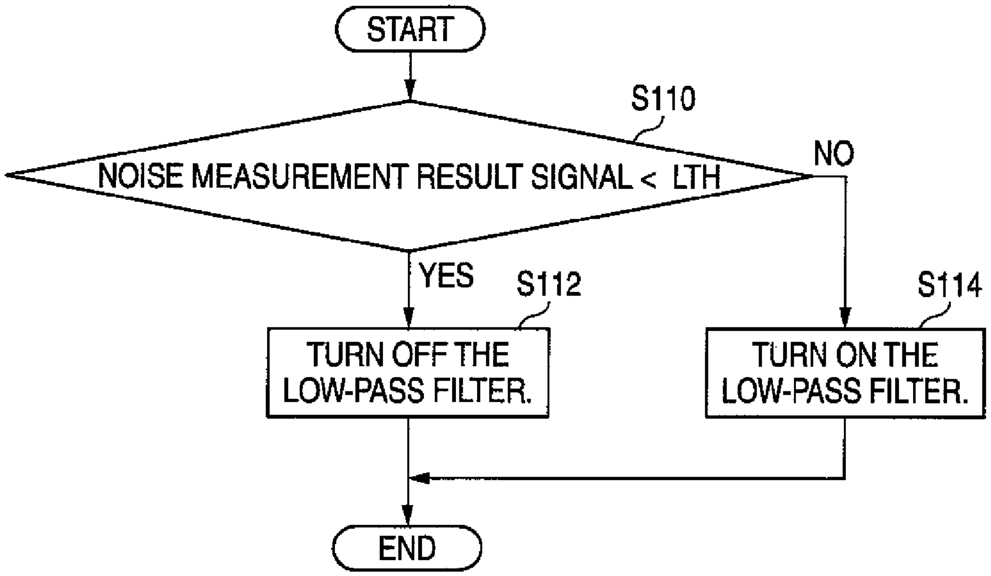
FIG. 9 is a flowchart showing an exemplary operation of turning on/off the low-pass filter in a differential signal suppression controller.

FIG. 9 is a flowchart showing an exemplary operation of turning on/off the low-pass filter in a differential signal suppression controller.

In case the noise measurement result signal outputted from the noise measuring part is below a predetermined threshold value (LTH) (step S110), the low-pass filter is turned off (step S112) In case the noise measurement result signal is not below a predetermined threshold value (LTH) (step S110), the low-pass filter is turned on (step S114). Turning on the low-pass filter refers to outputting a signal that has passed through the low-pass filter. Turning off the low-pass filter refers to outputting a signal that has not passed through the low-pass filter.

Figure 16:
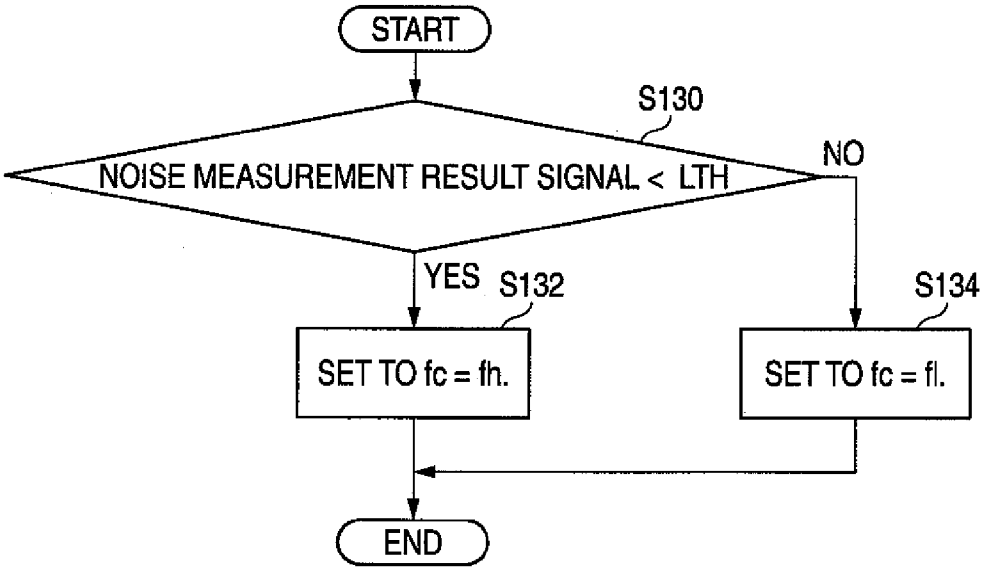
FIG. 16 is a flowchart showing an exemplary operation of switchover of cutoff frequency of the low-pass filter in the differential signal suppression controller.

FIG. 16 is a flowchart showing an exemplary operation of switchover of cutoff frequency of the low-pass filter in the differential signal suppression controller.

In case the noise measurement result signal outputted from the noise measuring part is below a predetermined threshold value (LTH) (step S130), the cutoff frequency fc of the low-pass filter is set to a large value (for example. fh=10 kHz) (step S132). In case the noise measurement result signal is not below a predetermined threshold value (LTH) (step S130), the cutoff frequency fc of the low-pass filter is set to a small value (for example, fl=1.5 kHz) (step S114).

Figure 17:
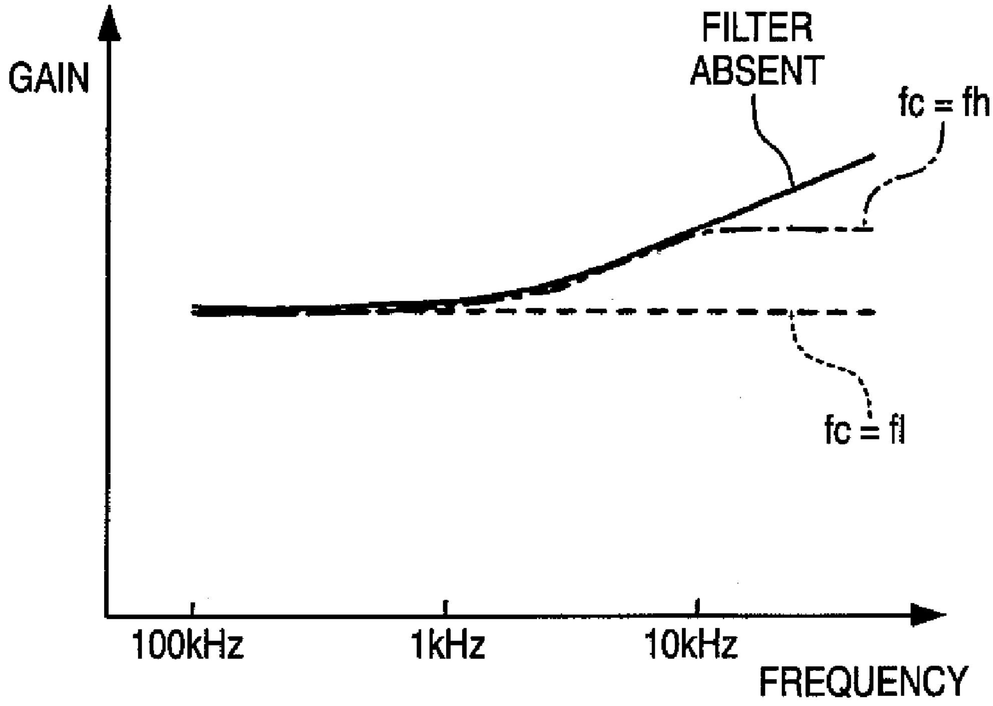
FIG. 17 shows the overall characteristics of the microphones and filter assumed when the cutoff frequency of the low-pass filter varies.

FIG. 17 shows the overall characteristics of the microphones and filter assumed when the cutoff frequency fc of the low-pass filter varies. The solid lines show the frequency response of the differential microphone alone. In case the cutoff frequency fc of the low-pass filter is set to fl (=1.5 kHz), the high frequency band of the differential microphone is suppressed to show almost flat characteristics as in the dotted lines. In case the cutoff frequency fc of the low-pass filter is set to fh (=10 kHz), the high frequency band to be suppressed shifts upward and the resulting characteristics in which the gain increases between 1.5 kHz and 10 kHz and becomes flat around 10 kHz as in the alternate long and short dashed lines.

Figure 14:
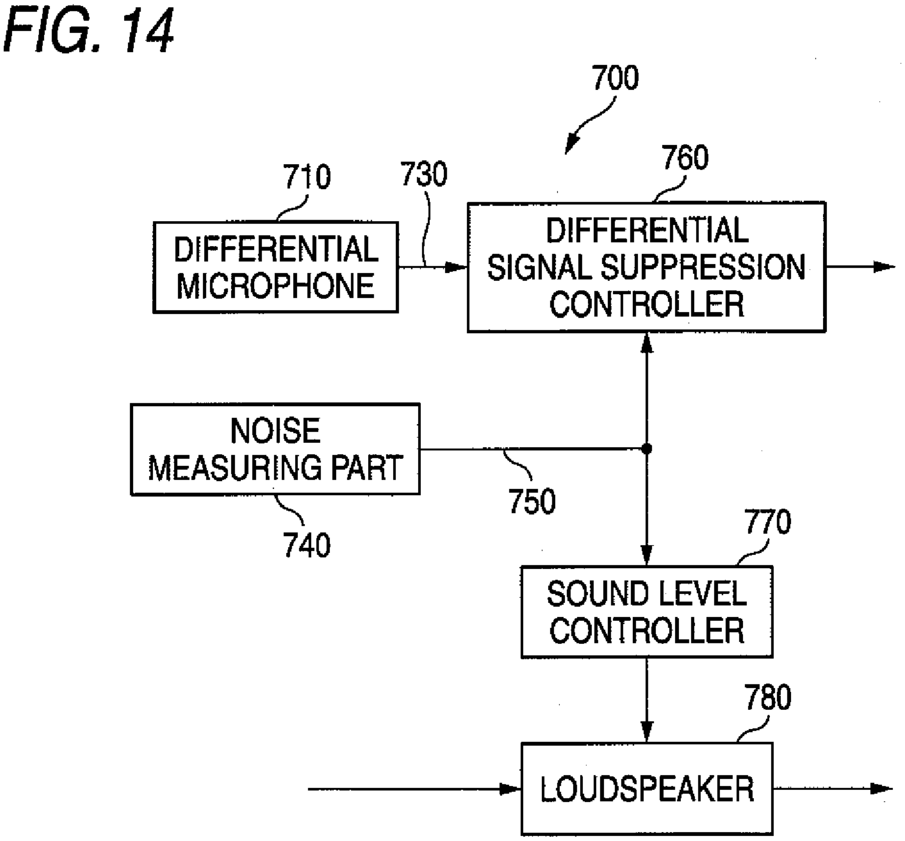
FIG. 14 illustrates a sound input device.

As shown in FIG. 14, a sound input device including a loudspeaker for outputting sound information may include a sound level controller 770 for controlling the sound level of the loudspeaker 780 based on a noise measurement result signal 750.

Figure 10:
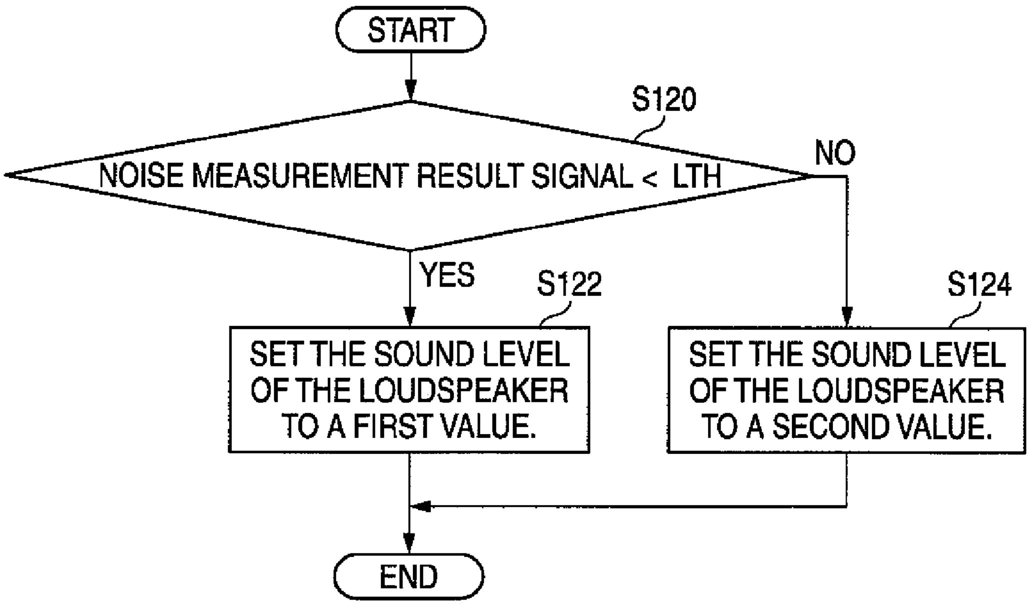
FIG. 10 is a flowchart showing an exemplary operation of controlling the sound level of the loudspeaker by way of a noise measurement result.

FIG. 10 is a flowchart showing an exemplary operation of controlling the sound level of the loudspeaker by way of noise detection.

In case the noise measurement result signal outputted from the noise measuring part is below a predetermined threshold value (LTH) (step S120), the sound level of the loudspeaker is set to a first value (step S122) In case the noise measurement result signal outputted from the noise measuring part is not below a predetermined threshold value (LTH) (step S120), the sound level of the loudspeaker is set to a second value larger than the first value (step S124).

In case the noise measurement result signal outputted from the noise measuring part is below a predetermined threshold value (LTH), the sound level of the loudspeaker may be dropped. In case the noise measurement result signal outputted from the noise measuring part is not below a predetermined threshold value (LTH), the sound level of the loudspeaker may be raised.

Figure 15:
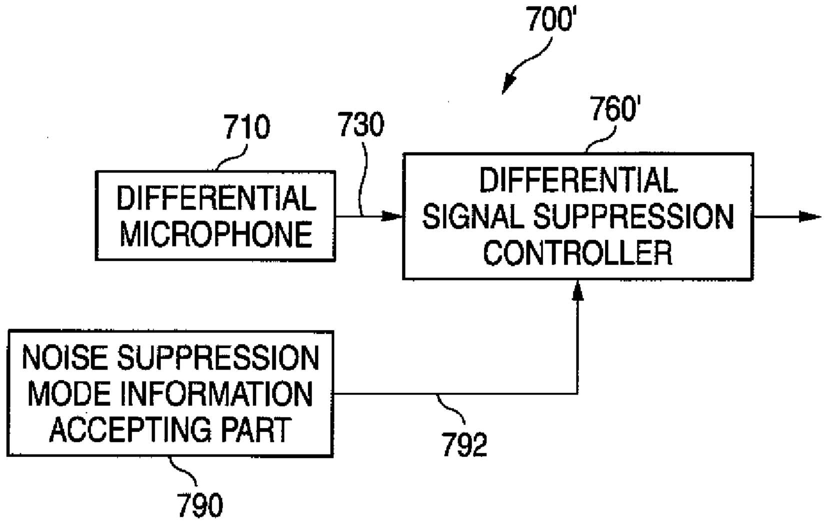
FIG. 15 illustrates a sound input device.

FIG. 15 illustrates another configuration of a sound input device according to this embodiment.

A sound input device 700' according to this embodiment includes a differential microphone 710. The differential microphone 710 generates and outputs a differential signal 730 based on input signals from a differential microphone (two microphones).

Control of turning on/off of a low-pass filter, change to a cutoff frequency fc, or sound level of a loudspeaker that is based on a noise measurement result may be made with hysteresis using a plurality of threshold values instead of using a single threshold value LTH. For example, a configuration is possible where a first mode (low-pass filter off) is activated when the outputted noise measurement result signal is below a threshold LTH1 and a second mode (low-pass filter on) is activated when the outputted noise measurement result signal is above a threshold LTH2.

The sound input device 700' according to this embodiment includes a noise suppression mode information accepting part 790. The noise suppression mode information accepting part 790 accepts noise suppression mode information on mode setting/change related to noise suppression of a differential microphone. The noise suppression mode information may be accepted by way of an operation input from an operation part such as a button and a switch arranged on a sound input device.

The sound input device 700 according to this embodiment includes a differential signal suppression controller 760'. The differential signal suppression controller 760' may perform the control of activating/deactivating suppression of the frequency components above a predetermined frequency of a differential signal outputted from a differential microphone 710 based on noise suppression mode information 792. For example, in case the noise suppression mode information 792 indicates the first mode (for example, a noise suppression activated mode, a highly noisy environment mode), the frequency components above a predetermined frequency of a differential signal 730 outputted from the differential microphone 710 may be suppressed. In case the noise suppression mode information 792 indicates the second mode (for example, a noise suppression deactivated mode, a quiet environment mode), the frequency components above a predetermined frequency of the differential signal 730 outputted from the differential microphone 710 may not be suppressed.

The differential signal suppression controller 760' may perform the control of the control of changing the frequency band where a differential signal outputted from the differential microphone 710 is suppressed (control to switch between low-pass filters having different cutoff frequencies) based on the noise suppression mode information 792. For example, a first low-pass filter having a cutoff frequency of 1.5 kHz or above and a second low-pass filter having a cutoff frequency of 10 kHz may be used to cause the differential signal 730 outputted from the differential microphone 710 to pass through the first low-pass filter to suppress the frequency components above 1.5 kHz in case the noise suppression mode information 792 indicates the first mode (for example, a noise suppression activated mode, a highly noisy environment mode), and to cause the differential signal 730 outputted from the differential microphone 710 to pass through the second low-pass filter to suppress the frequency components above 10 kHz in case the noise suppression mode information 792 indicates the second mode (for example, a noise suppression deactivated mode, a quiet environment mode).

In a highly noisy environment, it is possible to use the first low-pass filter having a lower cutoff frequency to suppress distant noise and nagging high-tone-emphasized background noise. In a less noisy environment, it is possible to use the second low-pass filter having a higher cutoff frequency to provide high-tone-emphasized characteristics. The high-band power of the background noise is low in a less noisy environment so that the high-tone-emphasized characteristics are not nagging. The high tone of a talker's voice is emphasized, thus compensating for reduction in the high-tone sensitivity of human ears that declines with age and offering a clear voice.

The invention is not limited to the above embodiments and various modifications thereto are possible. The invention includes substantially the same configuration (same configuration in terms of feature, method and result or same configuration in terms of object and effect) as those described in the foregoing embodiments. The invention includes a configuration in which a non-essential portion of the configuration described in any one of the above embodiments is replaced with another portion The invention includes a configuration having the same working effect as that in any one of the foregoing configurations or a configuration capable of attaining the sane object as any one of the foregoing configurations. The invention includes a configuration in which a well-known technique is added to any one of the foregoing configuration.

What is claimed is:

1. A sound input device, comprising:

a differential microphone configured to receive sound including noise and generate a first signal in accordance with the sound;

a detector configured to detect the noise and generate a second signal in accordance with the detected noise; and a controller configured to control at least one of suppression of high-frequency components of the first signal and changing of a frequency band to be suppressed of the first signal based on the second signal, wherein the differential microphone includes:

a first microphone having a first vibrating membrane;

a second microphone having a second vibrating membrane; and a differential signal generator configured to generate a differential signal indicative of a difference between a first voltage signal acquired by the first microphone and a second voltage signal acquired by the said second microphone, and the detector includes:

a first unit, configured to give a delay for noise detection to the second voltage signal; and a second unit, configured to generate the second signal based on a difference between the second voltage signal given the delay by the first unit and the first voltage signal.

2. The sound input device according to claim 1, wherein the detector includes a generator configured to change a delay balance of the differential microphone to generate the second signal.

3. The sound input device according to claim 1, wherein the detector generates the second signal by referencing the first signal.

4. The sound input device according to claim 1, wherein the delay is set to a time period obtained by dividing a distance between centers of the first and second vibrating membranes by the velocity of sound.

5. A sound input device, comprising:

a differential microphone configured to receive sound including noise and generate a first signal in accordance with the sound;

a detector configured to detect the noise and generate a second signal in accordance with the detected noise;

a controller configured to control at least one of suppression of high-frequency components of the first signal and changing of a frequency band to be suppressed of the first signal based on the second signal, a loudspeaker, configured to output sound information; and a sound level controller, configured to control sound level of the loudspeaker based on the second signal.

6. The sound input device according to claim 5, wherein the detector includes a generator configured to change a delay balance of the differential microphone to generate the second signal.

7. The sound input device according to claim 5, wherein the detector generates the second signal by referencing the first signal.

8. The sound input device according to claim 5, wherein the differential microphone includes:

a first microphone having a first vibrating membrane;

a second microphone having a second vibrating membrane; and a differential signal generator configured to generate a differential signal indicative of a difference between a first voltage signal acquired by the first microphone and a second voltage signal acquired by the second microphone, and the detector includes:

a first unit, configured to give a delay for noise detection to the second voltage signal; and a second unit, configured to generate the second signal based on a difference between the second voltage signal given the delay by the first unit and the first voltage signal.

9. The sound input device according to claim 5, wherein the delay is set to a time period obtained by dividing a distance between centers of the first and second vibrating membranes by the velocity of sound.

* * * * *